(12) United States Patent
Moser et al.

(10) Patent No.: US 12,339,439 B2
(45) Date of Patent: Jun. 24, 2025

(54) FIBER POSITIONING UNIT FOR TELESCOPES

(71) Applicant: MPS MICRO PRECISION SYSTEMS AG, Biel/Bienne (CH)

(72) Inventors: Yves Moser, Yverdon-les-Bains (CH); Stefane Caseiro, Saxon (CH); José Carrera, Chabrey Vully-les-Lacs (CH)

(73) Assignee: MPS MICRO PRECISION SYSTEMS AG, Biel/Bienne (CH)

( * ) Notice: Subject to any disclaimer, the term of this patent is extended or adjusted under 35 U.S.C. 154(b) by 127 days.

(21) Appl. No.: 18/253,821

(22) PCT Filed: Nov. 15, 2021

(86) PCT No.: PCT/IB2021/060564
§ 371 (c)(1),
(2) Date: May 22, 2023

(87) PCT Pub. No.: WO2022/106983
PCT Pub. Date: May 27, 2022

(65) Prior Publication Data
US 2024/0004187 A1 Jan. 4, 2024

(30) Foreign Application Priority Data
Nov. 20, 2020 (WO) .................. PCT/IB2020/060955

(51) Int. Cl.
*G02B 26/10* (2006.01)
*G02B 6/36* (2006.01)

(52) U.S. Cl.
CPC ......... *G02B 26/103* (2013.01); *G02B 6/3604* (2013.01)

(58) Field of Classification Search
None
See application file for complete search history.

(56) References Cited

U.S. PATENT DOCUMENTS

2009/0135409 A1\* 5/2009 Ruchet .................. G02B 6/274
385/11

FOREIGN PATENT DOCUMENTS

CN 2344786 Y 10/1999
CN 1095085 C \* 11/2002

OTHER PUBLICATIONS

Translation of supplied CN1095085C (Year: 2002).\*
(Continued)

*Primary Examiner* — Chad H Smith
(74) *Attorney, Agent, or Firm* — Nixon & Vanderhye P.C.

(57) ABSTRACT

Fiber positioning unit of SCARA type comprising an alpha (1,2,3) and a beta mechanism (4,5); the alpha mechanism successively comprising a motor (1), a driving shaft (2) and a rotatable shaft (3), the rotation of the rotatable shaft (3) being carried out by the alpha motor (1) via the driving shaft (2); the beta mechanism comprising a motor (4) and a fiber holding element (5) that may be rotated by the beta motor (4); both mechanisms being mechanically connected in a way to allow a rotation of the beta mechanism (4,5) by the rotatable shaft (3); the alpha mechanism (1,2,3) being furthermore adapted to be partially located within a focal plate (6), characterized by the fact that the alpha motor (1) is adapted to be located on one side of the focal plate (6) while the rotatable shaft (3) and the beta mechanism (4,5) are adapted to be located on the other side of the focal plate (6).

9 Claims, 10 Drawing Sheets

(56) References Cited

OTHER PUBLICATIONS

Charles Fisher, et al., "Cobra: A Two-Degree of Freedom Fiber Optic Positioning Mechanism", Aerospace Conference, Jan. 5, 2009, 12 pages, URL: http://ieeexplore.ieee.org/ielx5/4813823/4839294/04839435.pdf?tp=&arnumber=4839435&isnumber=4839294.
David Montgomery, et al., "Development of the fibre positioning unit of Moons", Proceedings of Spie, vol. 9908, Aug. 4, 2016, pp. 990895-1-990895-15 (15 pages).
International Search Report for PCT/IB2021/060564 mailed Mar. 17, 2022, 3 pages.
Written Opinion of the ISA for PCT/IB2021/060564 mailed Mar. 17, 2022, 6 pages.

\* cited by examiner

FIBER POSITIONING UNIT FOR TELESCOPES

CROSS-REFERENCE TO ELATED APPLICATIONS

This application is the U.S. national phase of International Application No. PCT/IB2021/060564 filed Nov. 15, 2021 which designated the U.S. and claims priority to PCT/IB2020/060955 filed Nov. 20, 2020,the entire contents of each of which are hereby incorporated by reference.

FIELD OF INVENTION

The present invention relates to a Fiber Positioning Unit (FPU) for telescopes. It more precisely concerns a FPU of the SCARA type.

State of the Art

Figure 1:
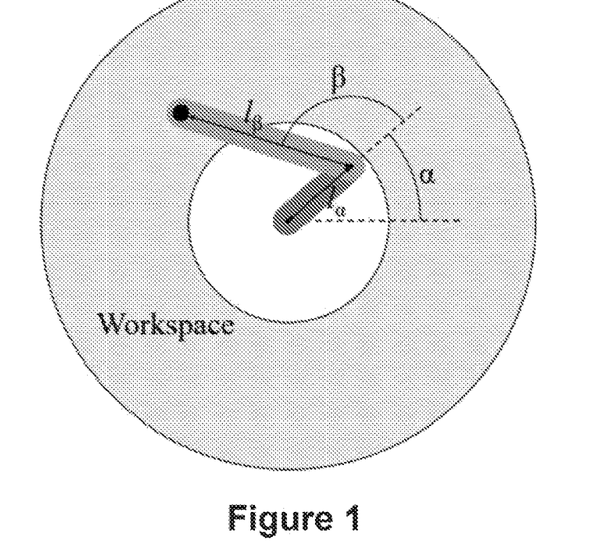
FIG. 1: Prior art FPU of the SCARRA type

A FPU of the SCARA type uses two parallel rotary joints to position a fiber free end within an annular workspace (see FIG. 1).

Figure 2:
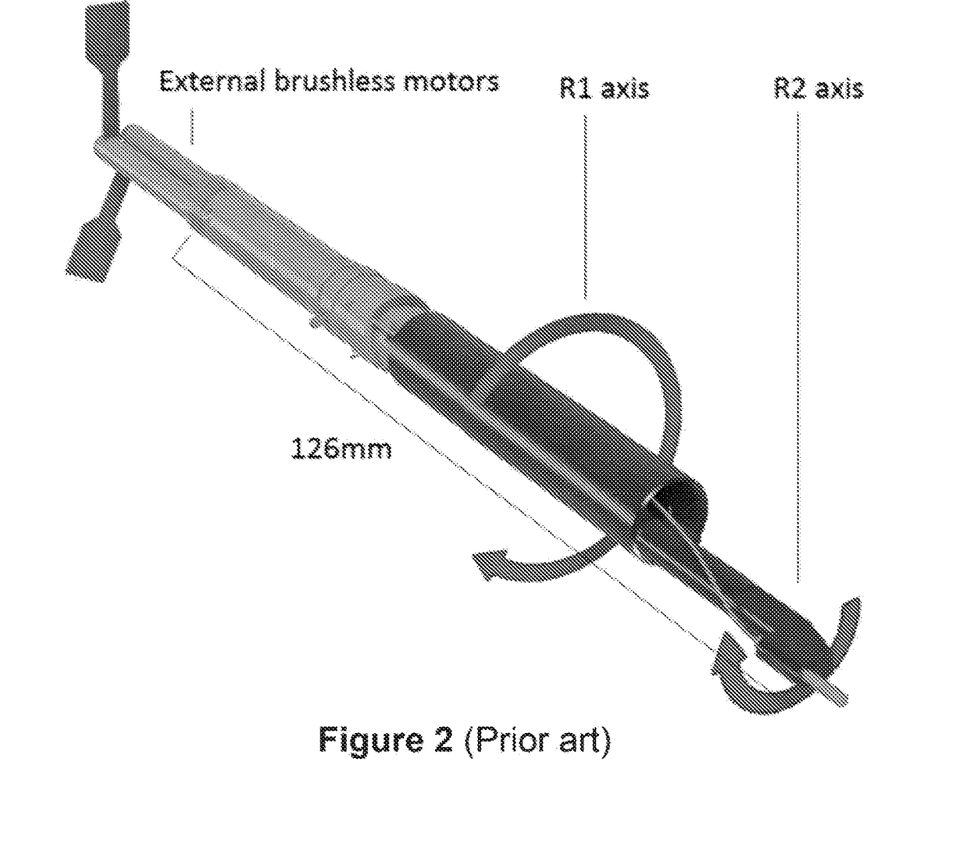
FIG. 2: Other example of a prior art FPU
Figure 5:
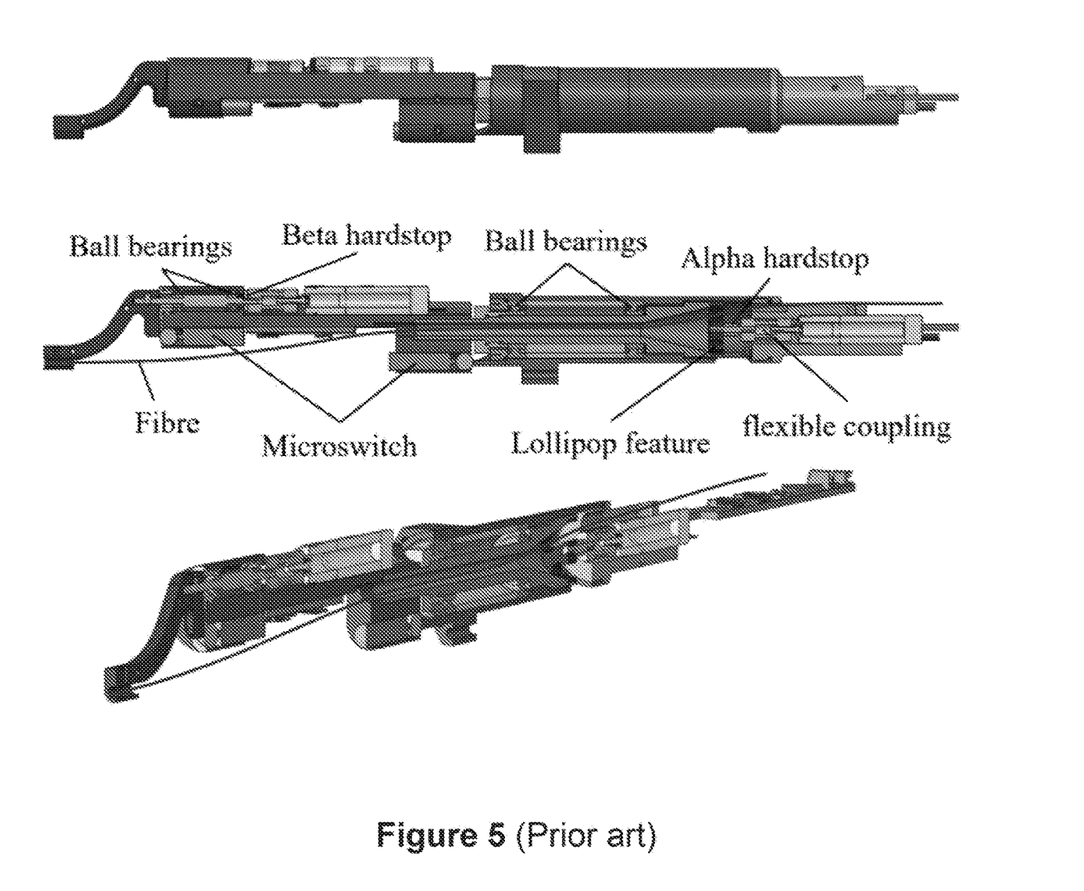
FIG. 5: Other example of a prior art FPU
Figure 6:
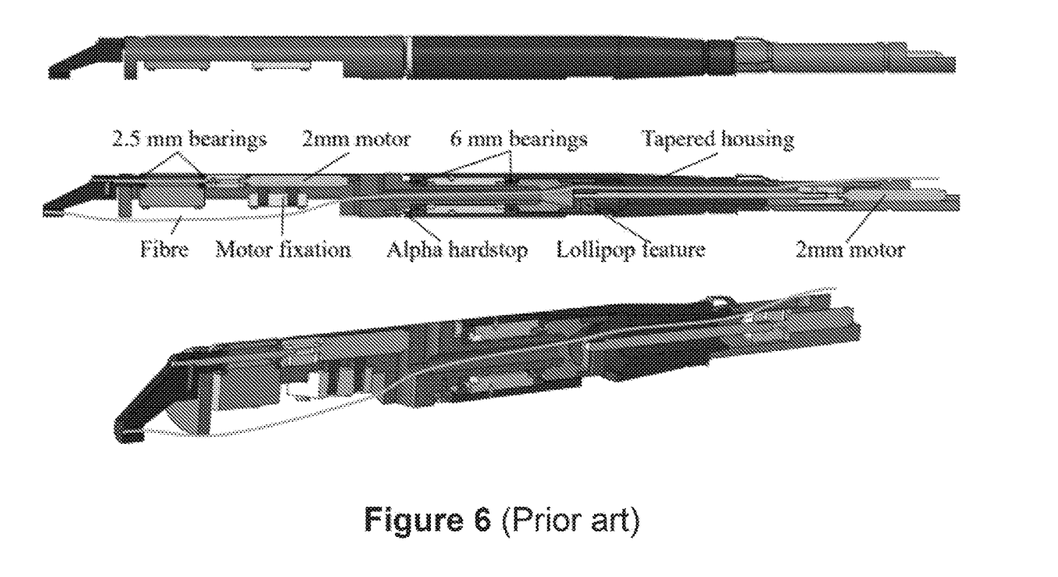
FIG. 6: Other example of a prior art FPU

Examples of existing FPU are shown in FIGS. 2, 5 and 6.

Figure 3:
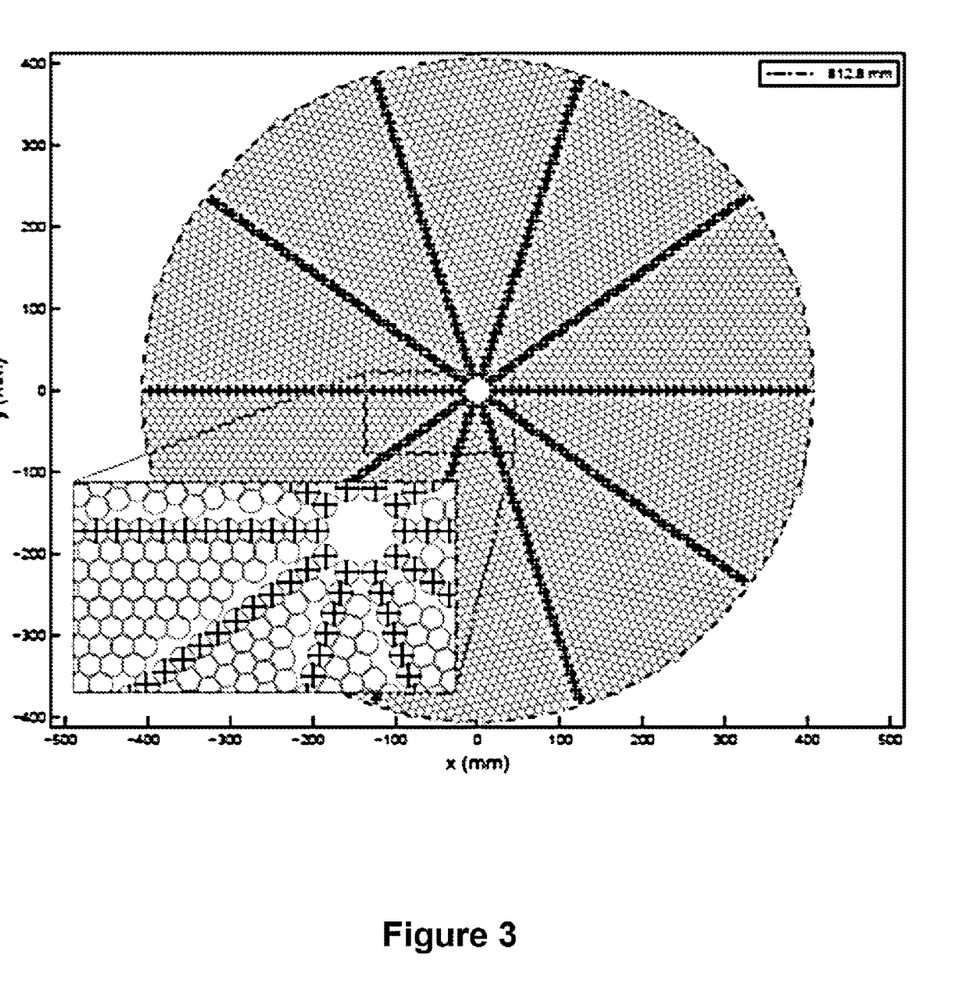
FIG. 3: Front view of a prior art focal plate

The FPU are fixed to a focal plate. FIG. 3 represents a front view of a focal plate. Nowadays, a maximum densification of FPU on the focal plate is desired, to increase the instrument throughput. Thus, the pitch between two adjacent FPU (Pitch=distance center to center), and therefore the FPU diameter, should be minimized.

Figure 4:
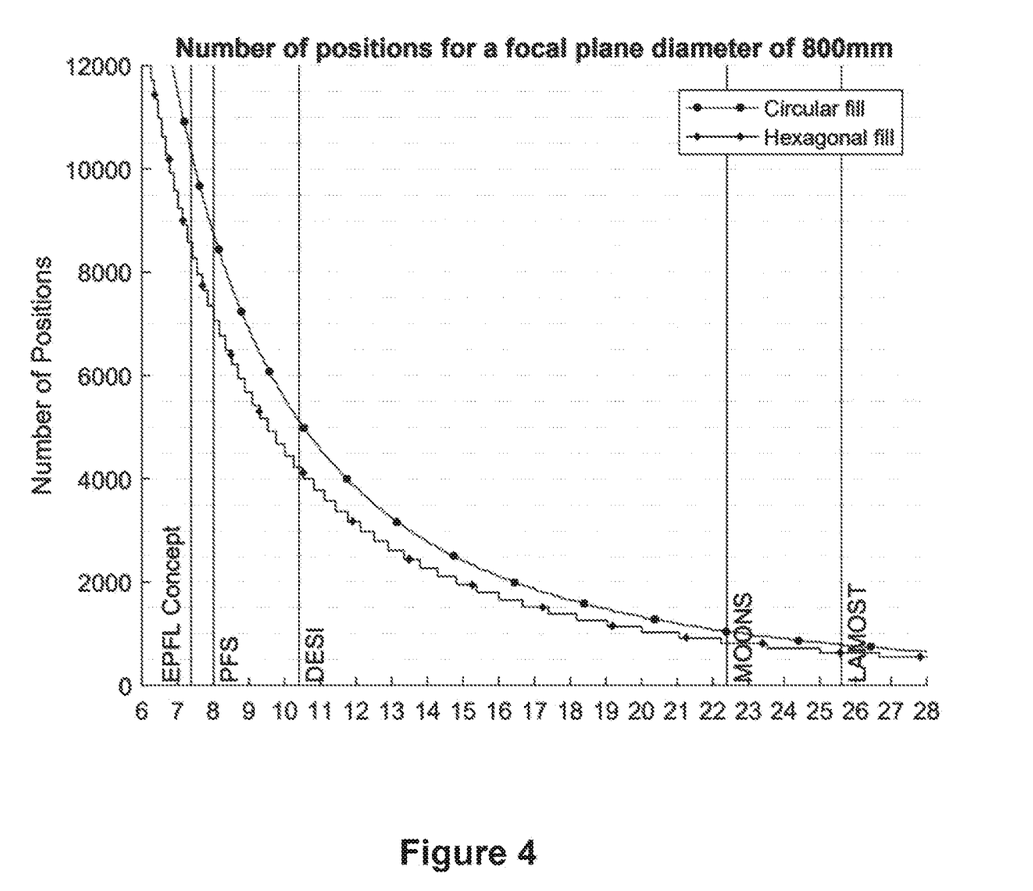
FIG. 4: Graph showing the density of FPU on a focal plate

The graph of FIG. 4 shows the number of FPU for a focal plate of 800 mm in diameter with respect to the positioner pitch.

FIG. 5 shows an FPU according to the state of the art. The FPU design is made of a single part. The optical fiber and the beta motor wires must be bent to pass on the side of the alpha motor. Any bending of the optical fiber reduces the system performance from an optical point of view.

FIG. 6 shows a tentative to miniaturize an FPU, with a diameter of approx. 7 mm. Such a relatively small object requires the use of an extremely small motor, typically 2 mm in diameter. This affects, i.e. reduces, the system performances (torque, precision, repeatability and robustness).

A FPU of the SCARA type usually comprises an alpha and a beta mechanism; the alpha mechanism successively comprising a motor, a driving shaft and a rotatable shaft (often a hollow shaft), the rotation of the rotatable shaft being carried out by the alpha motor via the driving shaft. The beta mechanism comprises a motor and a fiber holding element that may be rotated by the beta motor 4. Both mechanisms are mechanically connected in a way to allow a rotation of the beta mechanism by the rotatable shaft. The rotatable shaft is located within or above a focal plate.

Figure 7:
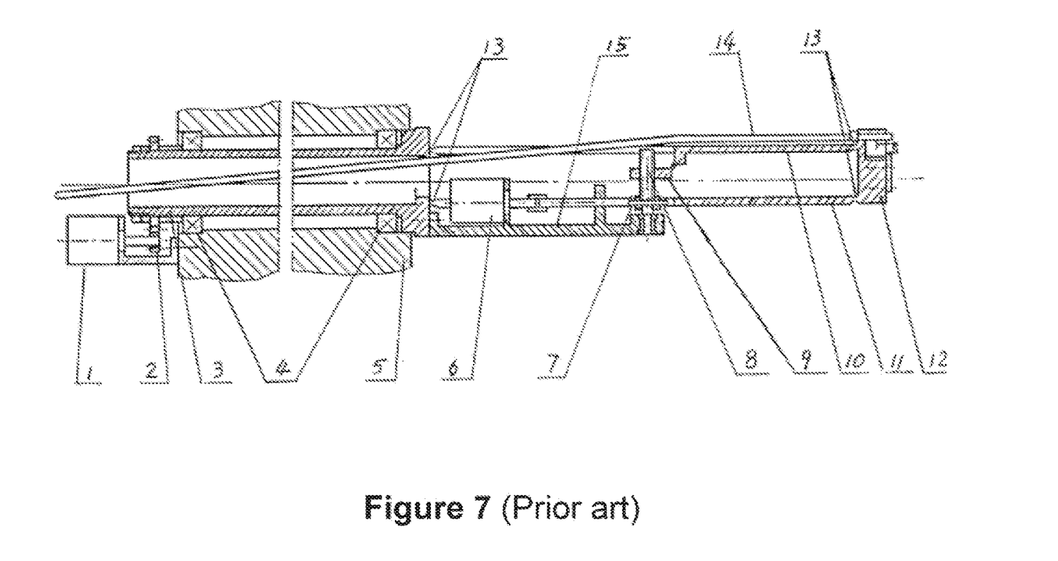
FIG. 7: Other example of a prior art FPU

The FPU disclosed in Chinese patent documents CN1095085C and CN2344786Y notably reduces the bending of the optical effect (see FIG. 7).

Figure 8:
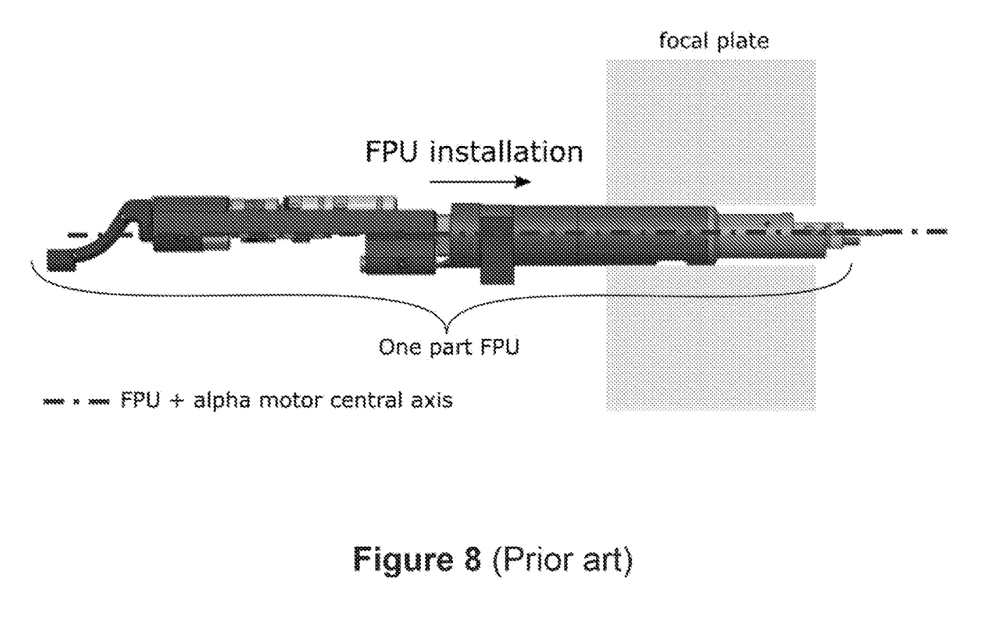
FIG. 8: Mounting of a FPU on a focal plate

Until now, FPU have been designed in a single part, that integrates the two motors. The FPU is mounted in one step on the focal plate (see FIG. 8).

Prior art FPU, in particular the previous ones cited in the previous cited Chinese patent documents, do however pose some challenges and/or problems, such as:
- A focal plate needs to be precise on both sides in order to position the ball bearings.
- A complex assembly has to be done directly on and within the focal plate: 1) Press fitting of the ball bearings from both sides. 2) Insertion of the FPU. 3) Insertion and fixation of a gear (by gluing or laser welding) on the rotatable shaft. 4) fixation of the motor. Such an assembly cannot be made for a high FPU density configuration.
- The rotatable shaft is in the focal plate, which means that a relatively large bore has to be drilled through the focal plate reducing its rigidity (which is critical with the mass of thousands of FPUs)
- It is impossible to test the performances of the FPU before its fixation to the focal plate. The assembly process into the focal plate being irreversible, if bad performances of a positioner are detected at this stage, it compromises the complete telescope performances. This simply prohibits the use of such approach for high density FPU telescopes.

There is therefore a need to improve the existing FPU to obtain a higher FPU density and a stronger stability of the general structure.

DESCRIPTION OF THE INVENTION

The problems mentioned in the previous chapter are solved with the FPU of present invention, as defined in the claims.

The FPU according to the invention is essentially made in two separated parts and may be mounted on the focal plate in two distinct and independent steps. The central axis of the FPU and the alpha motor are not concentric. With such a configuration, the optical fiber may be maintained essentially straight along the FPU body. This configuration also allows the use of motors with a diameter very close to the diameter of the pitch for the rotatable shaft, typically of 6 mm, which results in an increase of the FPU density on the focal plate. The use of an alpha motor and gearbox with a diameter very close to the pitch makes the complete design more robust and precise for a given pitch.

NUMERICAL REFERENCES USED IN THE FIGS. 9 TO 12

Figure 9:
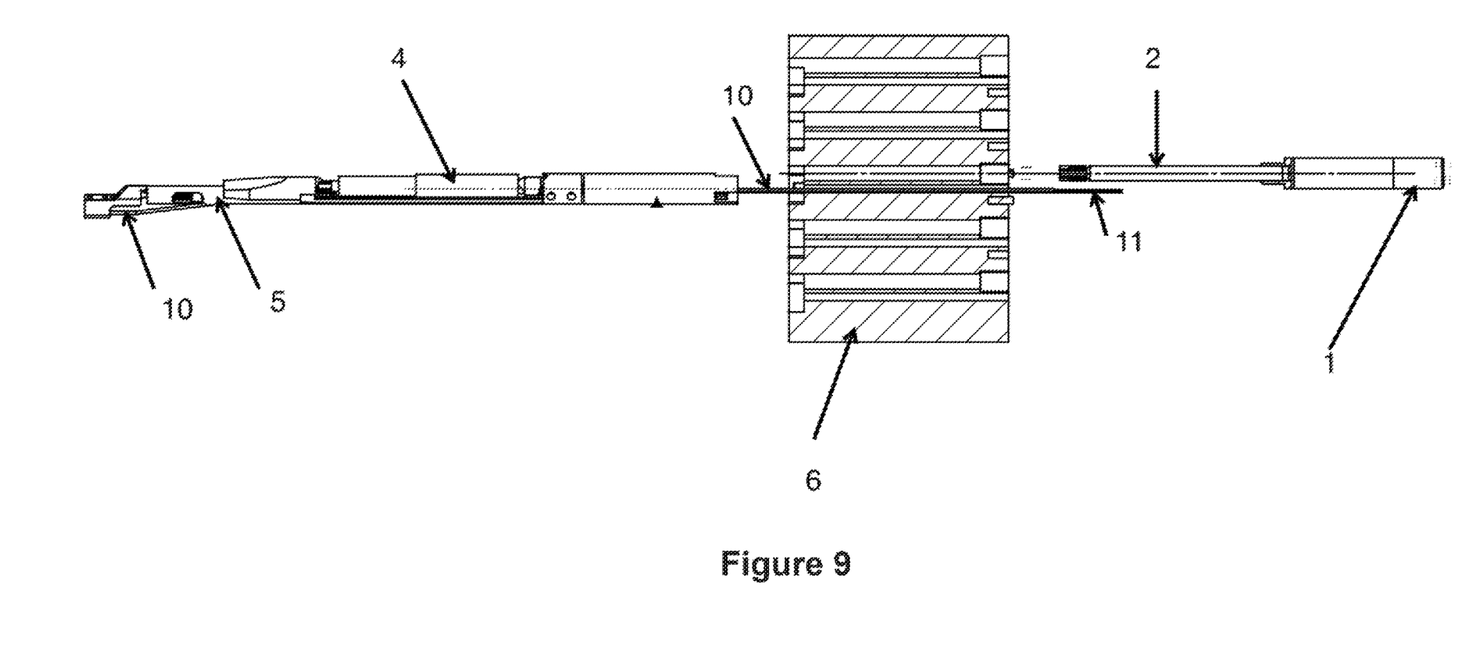
FIG. 9: Example of a FPU according to the invention
Figure 10:
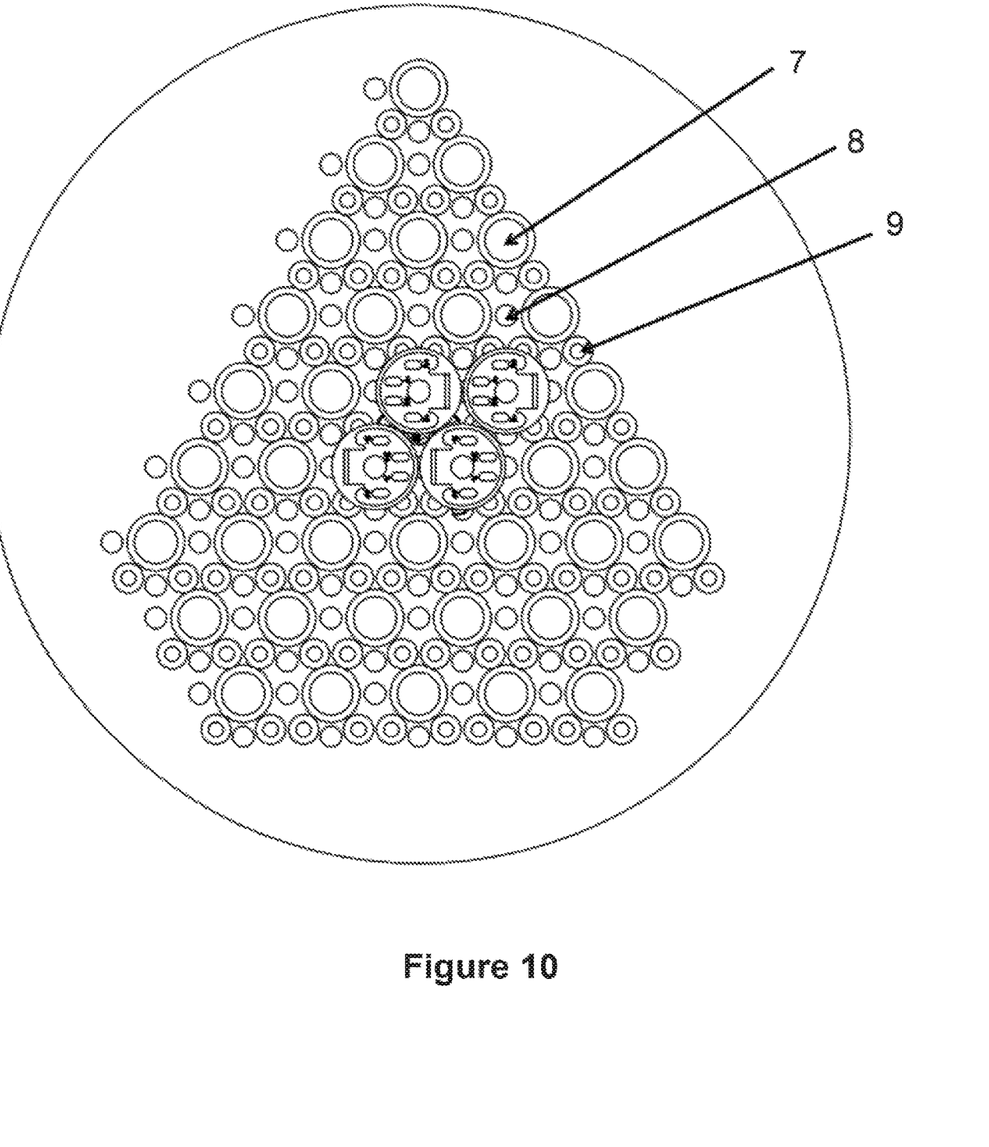
FIG. 10: Front view of a focal plate according to the invention
Figure 11:
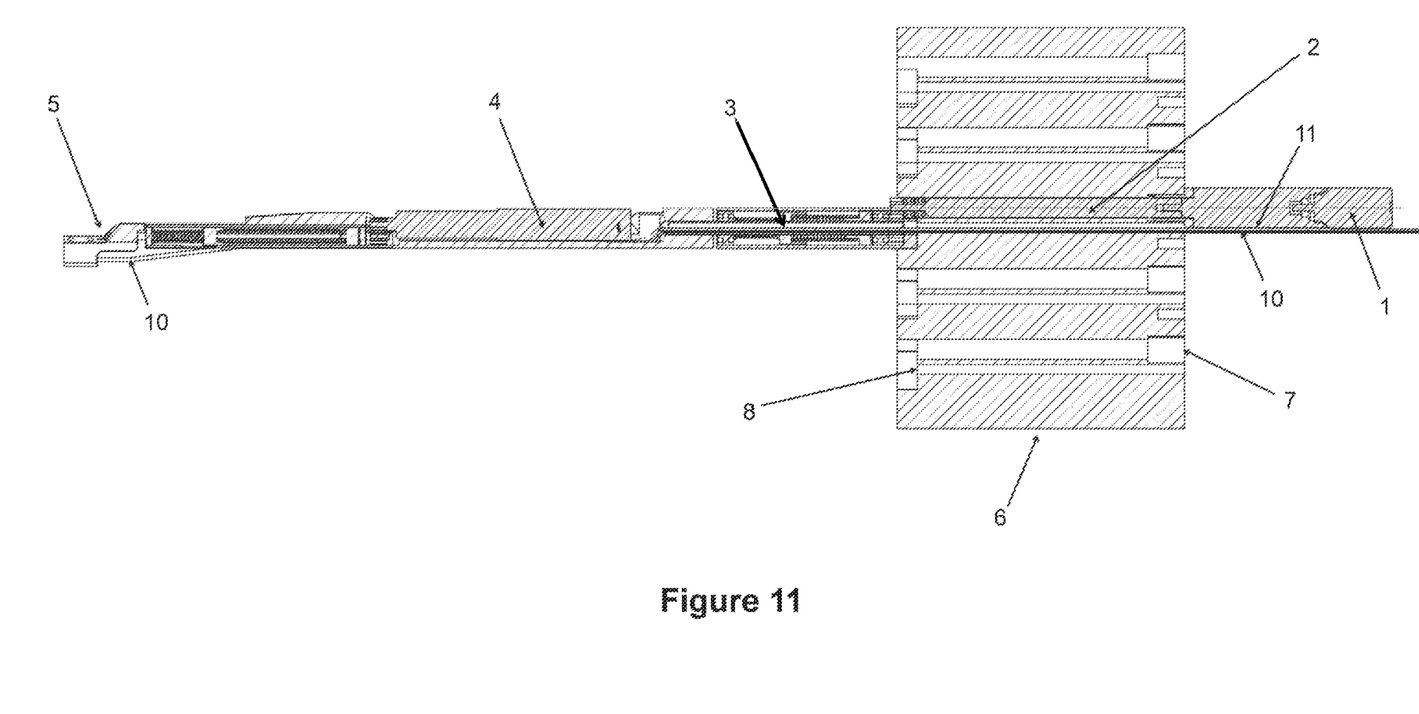
FIG. 11: Other view of the FPU of FIG. 9
FIG. 12: Other view of the FPU of FIG. 9
Figure 12:
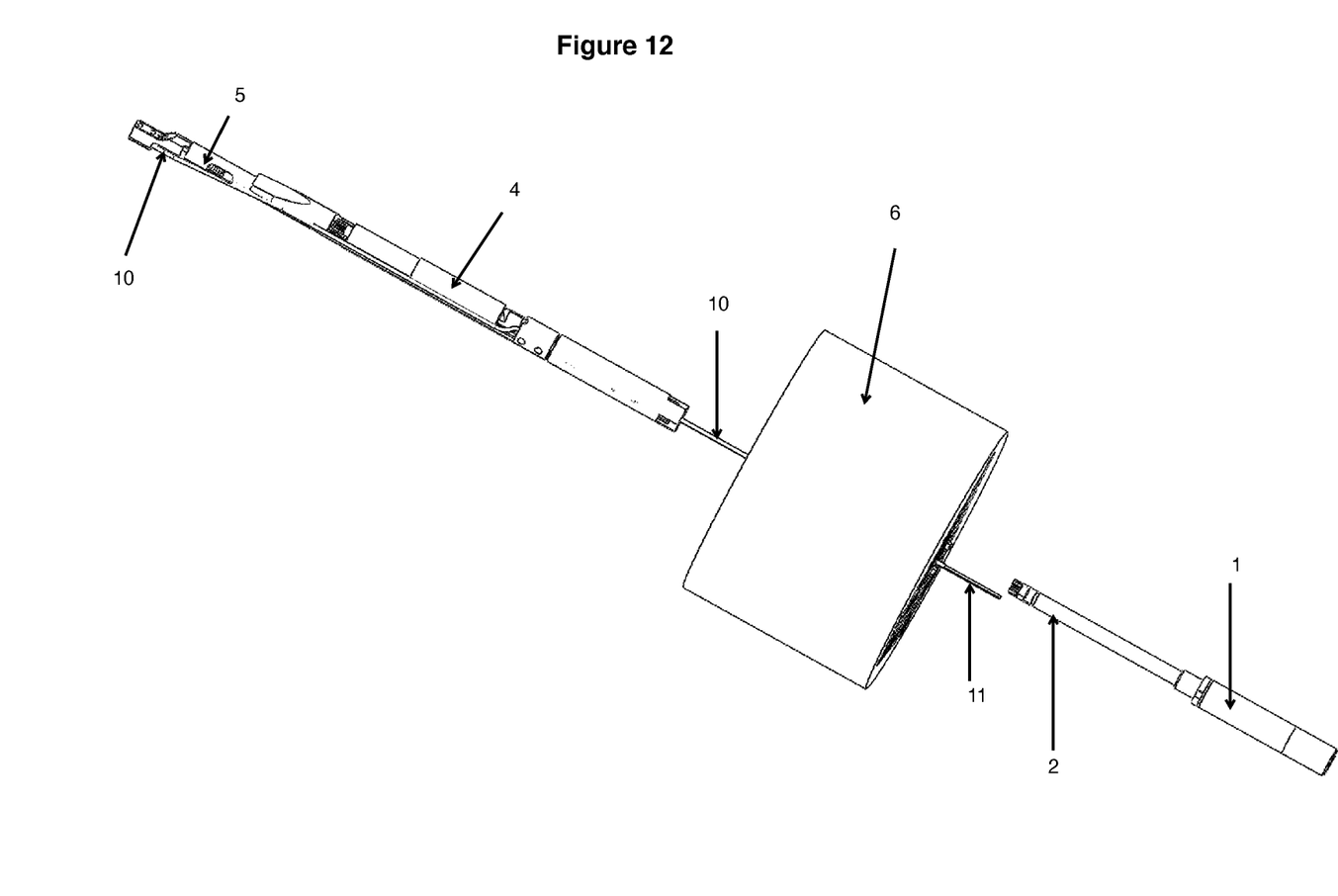

1. Alpha motor
2. Driving shaft
3. Hollow rotatable shaft
4. Beta motor
5. Fiber holding element
6. Focal plate
7. Driving shaft passage
8. Optic fiber passage
9. Electric wire passage
10. Optical fiber
11. Beta motor electric wire FIG. 9 shows an example of a FPU according to the invention with the optical fiber being straight and placed between two adjacent alpha motors 1.

The FPU according to the present invention provides the following advantages:

- The focal plate 6 may be more easily manufactured.
- Assembling the FPUs on the focal plate 6 does not require any complex process.
- FPUs are preferably screwed, the alpha motor 1 being inserted on one side of the focal plate 6 and held in position by friction and the beta mechanism 4,11 being positioned and fixed on the other side of the focal plate 6. A press fitted pin may be advantageously used to avoid rotation of the motor. (No glue or laser welding are required).
- The alpha rotatable shaft 3 and the beta mechanism 4,11 are on the same side of the focal plate 6, the passages 7,8,6 within the focal plate 6 are therefore relatively small, which results in a more robust structure.
- It is possible to test the performances of each positioner before assembling it on the focal plate 6.

The invention claimed is:

1. A fiber positioning unit of Selective Compliance Assembly Robot Arm (SCARA) type comprising an alpha and a beta mechanism; the alpha mechanism successively comprising an alpha motor, a driving shaft and a rotatable shaft, the rotation of the rotatable shaft being carried out by the alpha motor via the driving shaft; the beta mechanism comprising a beta motor and a fiber holding element that may be rotated by the beta motor; both mechanisms being mechanically connected in a way to allow a rotation of the beta mechanism by the rotatable shaft; the alpha mechanism being furthermore adapted to be partially located within a focal plate, characterized by the fact that the alpha motor is adapted to be located on one side of the focal plate while the rotatable shaft and the beta mechanism are adapted to be located mainly on an other side of the focal plate.

2. The fiber positioning unit according to claim 1 wherein the rotatable shaft at least partially extends through the focal plate.

3. The fiber positioning unit according to claim 1 wherein a motor diameter, of the alpha motor or the beta motor, is comprised between 2 and 6 mm.

4. An assembly comprising a focal plate and several fiber positioning units as defined in claim 1, the focal plate comprising passages with different diameters, wherein a greatest diameter is approximatively equivalent to a diameter of the driving shaft.

5. An assembly according to claim 4 wherein a motor diameter of the alpha motor or the beta motor, is similar to a pitch.

6. An assembly according to claim 4 wherein said focal plate consists of a plurality of sub-modules.

7. An assembly according to claim 5 wherein each sub-module has a polygonal cross section, for instance a triangular section.

8. A method for assembling fiber positioning units as defined in claim 1 on a focal plate wherein the alpha motor is inserted and fixed on one side of the focal plate and wherein the beta mechanism is positioned and fixed on the other side of the focal plate.

9. A method according to claim 1 wherein the alpha motor and the beta mechanism are mounted on the focal plate in two distinct and independent steps.

* * * * *